(12) United States Patent
Breitenfeldt et al.

(10) Patent No.: US 10,948,330 B2
(45) Date of Patent: Mar. 16, 2021

(54) FLOOD SENSOR

(71) Applicant: Itron, Inc., Liberty Lake, WA (US)

(72) Inventors: Thomas Breitenfeldt, Mankato, MN (US); Matt Jordison, Blooming Prairie, MN (US)

(73) Assignee: Itron, Inc., Liberty Lake, WA (US)

( * ) Notice: Subject to any disclaimer, the term of this patent is extended or adjusted under 35 U.S.C. 154(b) by 137 days.

(21) Appl. No.: 16/237,113

(22) Filed: Dec. 31, 2018

(65) Prior Publication Data
US 2020/0209041 A1    Jul. 2, 2020

(51) Int. Cl.
*G08B 21/20* (2006.01)
*G01F 23/24* (2006.01)
*G01F 23/76* (2006.01)
*G08B 21/18* (2006.01)

(52) U.S. Cl.
CPC ............ *G01F 23/241* (2013.01); *G01F 23/76* (2013.01); *G08B 21/182* (2013.01); *G08B 21/20* (2013.01)

(58) Field of Classification Search
CPC .................................. E03B 1/00; F16K 1/00
See application file for complete search history.

(56) References Cited

U.S. PATENT DOCUMENTS

| 2015/0247584 A1* | 9/2015 | Singley ............... E03B 7/071 251/69 |
| 2018/0166756 A1* | 6/2018 | Inoue ............... H01M 10/486 |
| 2019/0094101 A1* | 3/2019 | Spiegel ............... G01M 3/36 |

* cited by examiner

Primary Examiner — Shirley Lu
(74) Attorney, Agent, or Firm — Lee & Hayes, P.C.

(57) ABSTRACT

A flood sensor apparatus configured to send a signal to a computing device causing the computing device to turn off a utility at a site experiencing a flood. The flood sensor apparatus may include a housing and a back cover which, when coupled together, form gaps along a perimeter of the flood sensor apparatus such that fluid (e.g., water) may quickly fill and drain an interior of the housing. These gaps may be large enough such that the fluid may quickly fill and drain the interior of the housing but small enough that debris may not clog the gap or enter the interior of the housing. The back cover may include a rib extending from an inner face of the back cover and that that runs along a perimeter of the inner face. The rib may prevent tampering of a flood sensor located in the interior of the housing by blocking any object that may be inserted into the gaps.

20 Claims, 9 Drawing Sheets

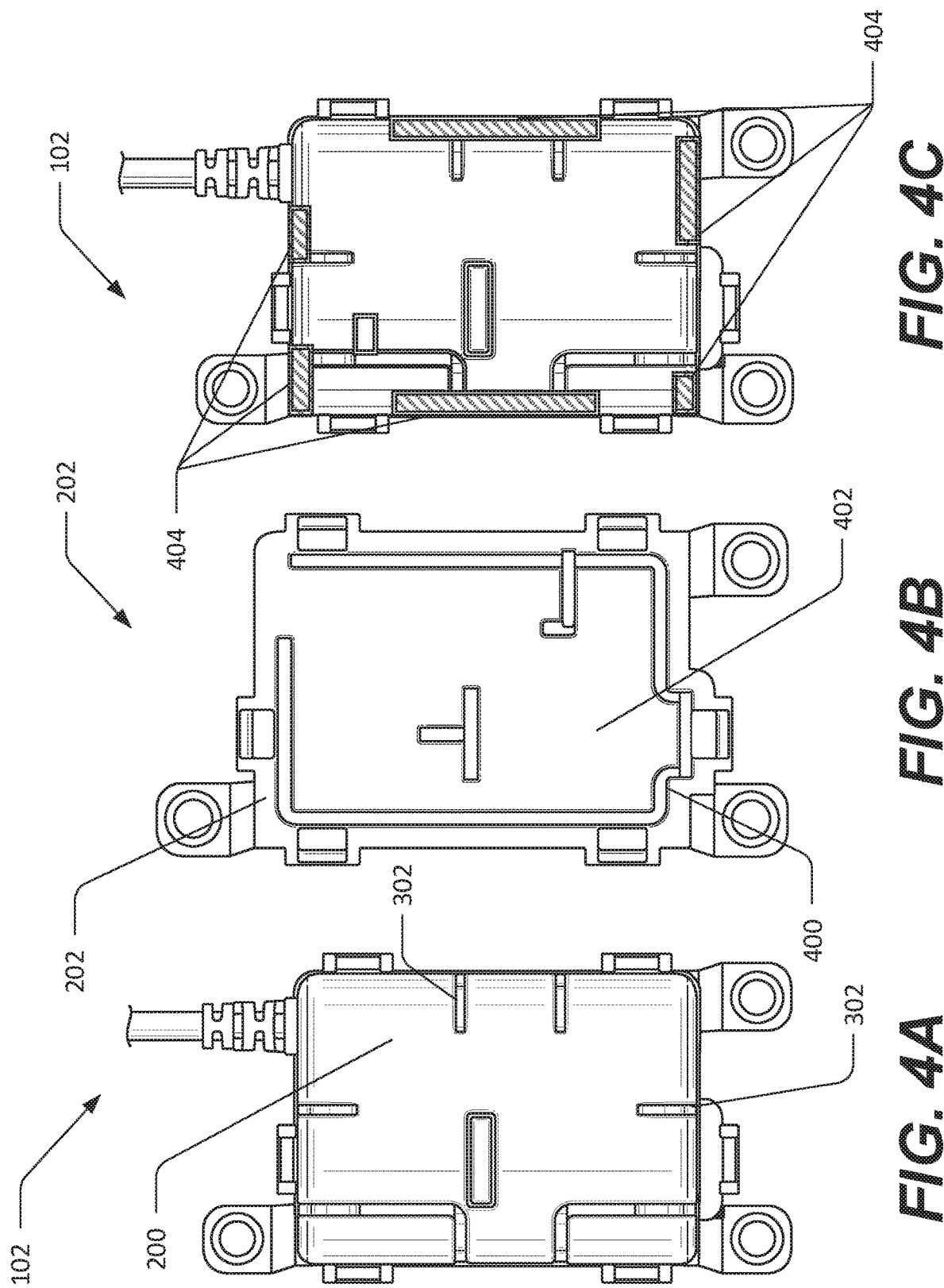

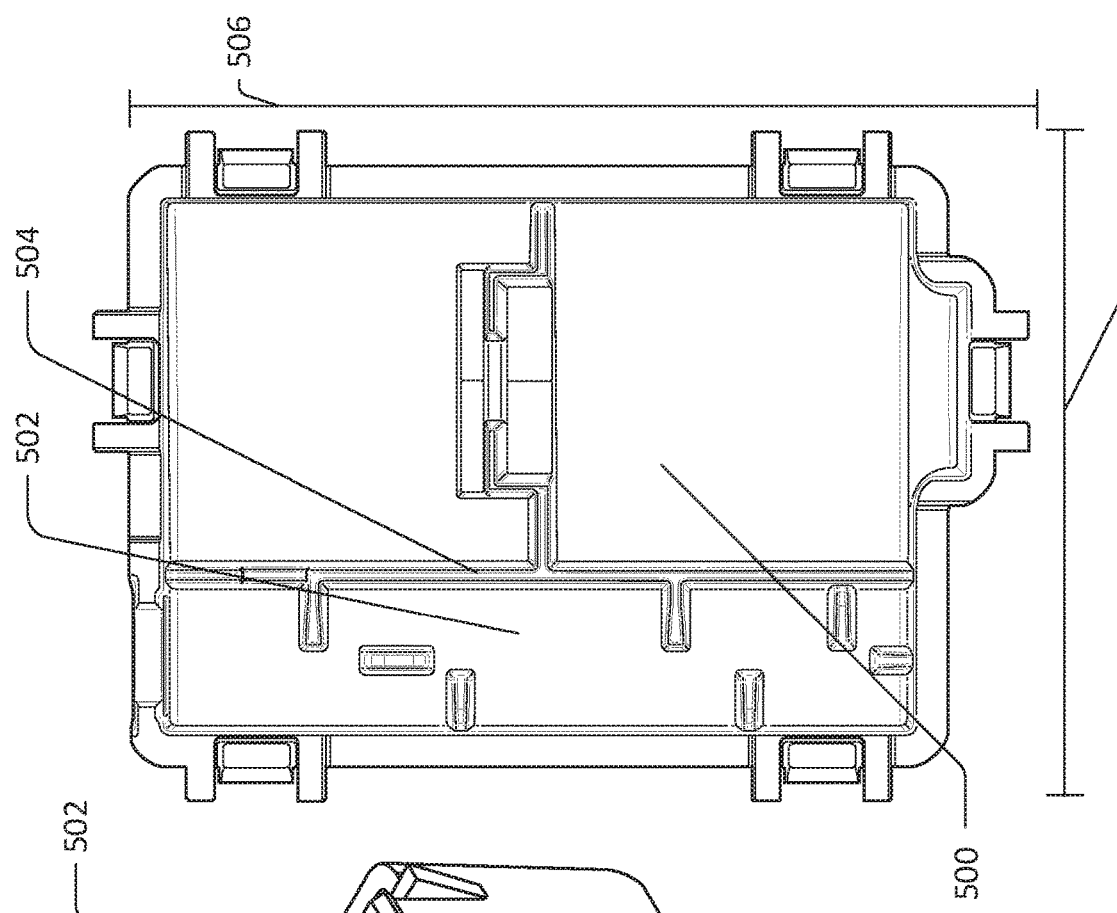
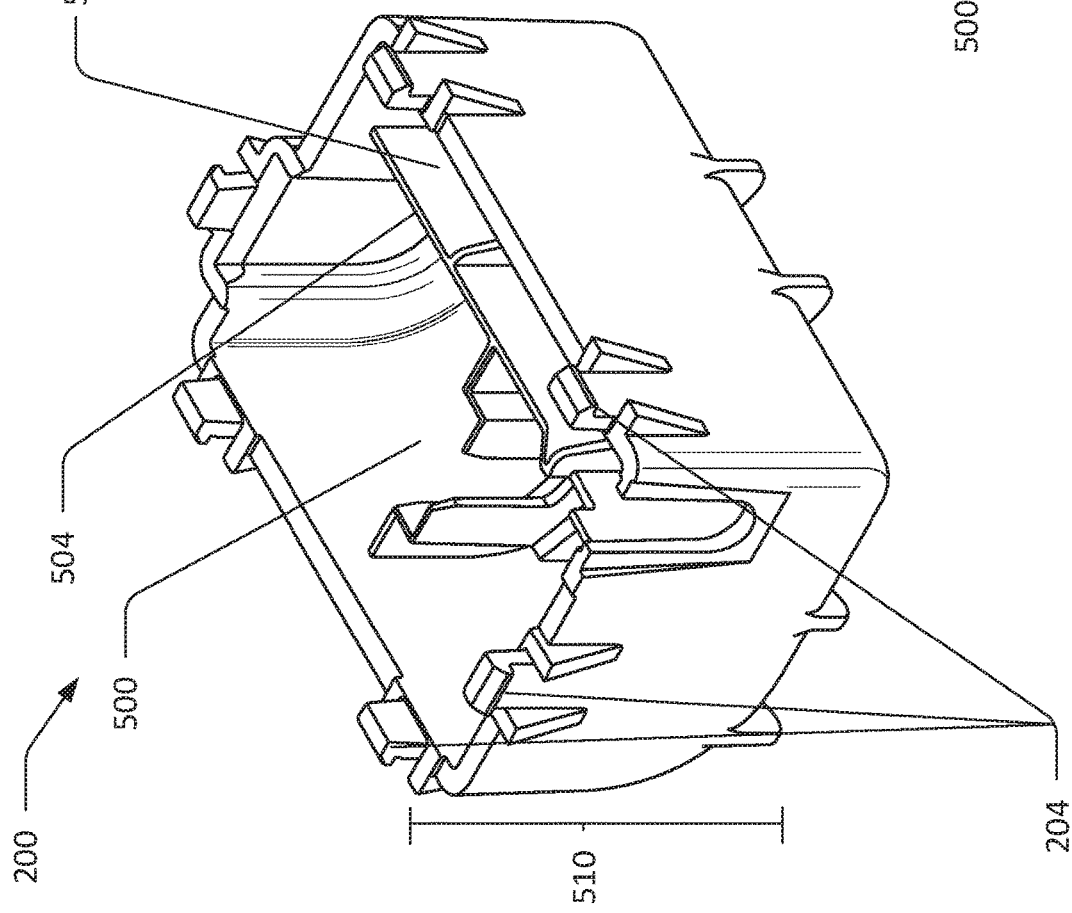
FIG. 5A
FIG. 5B

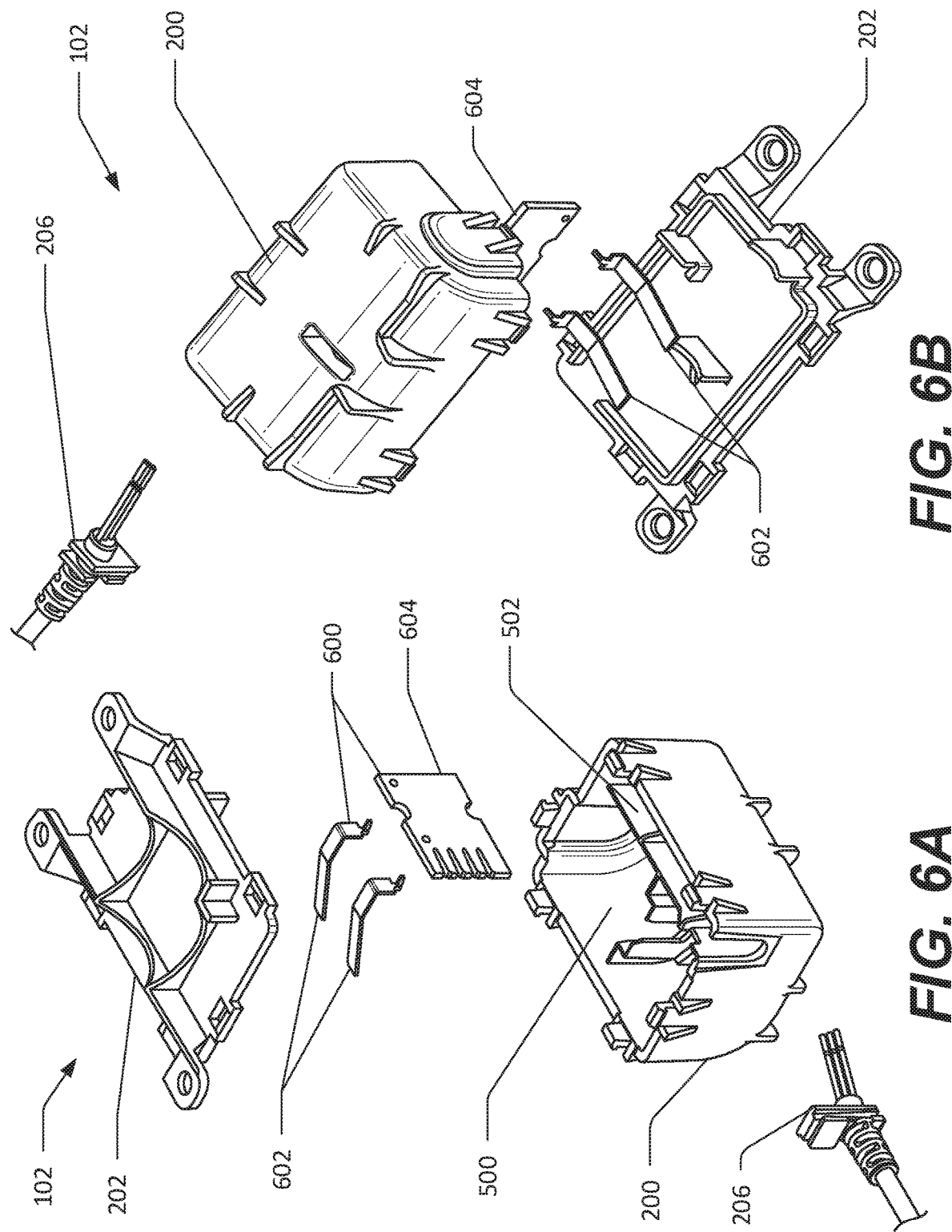

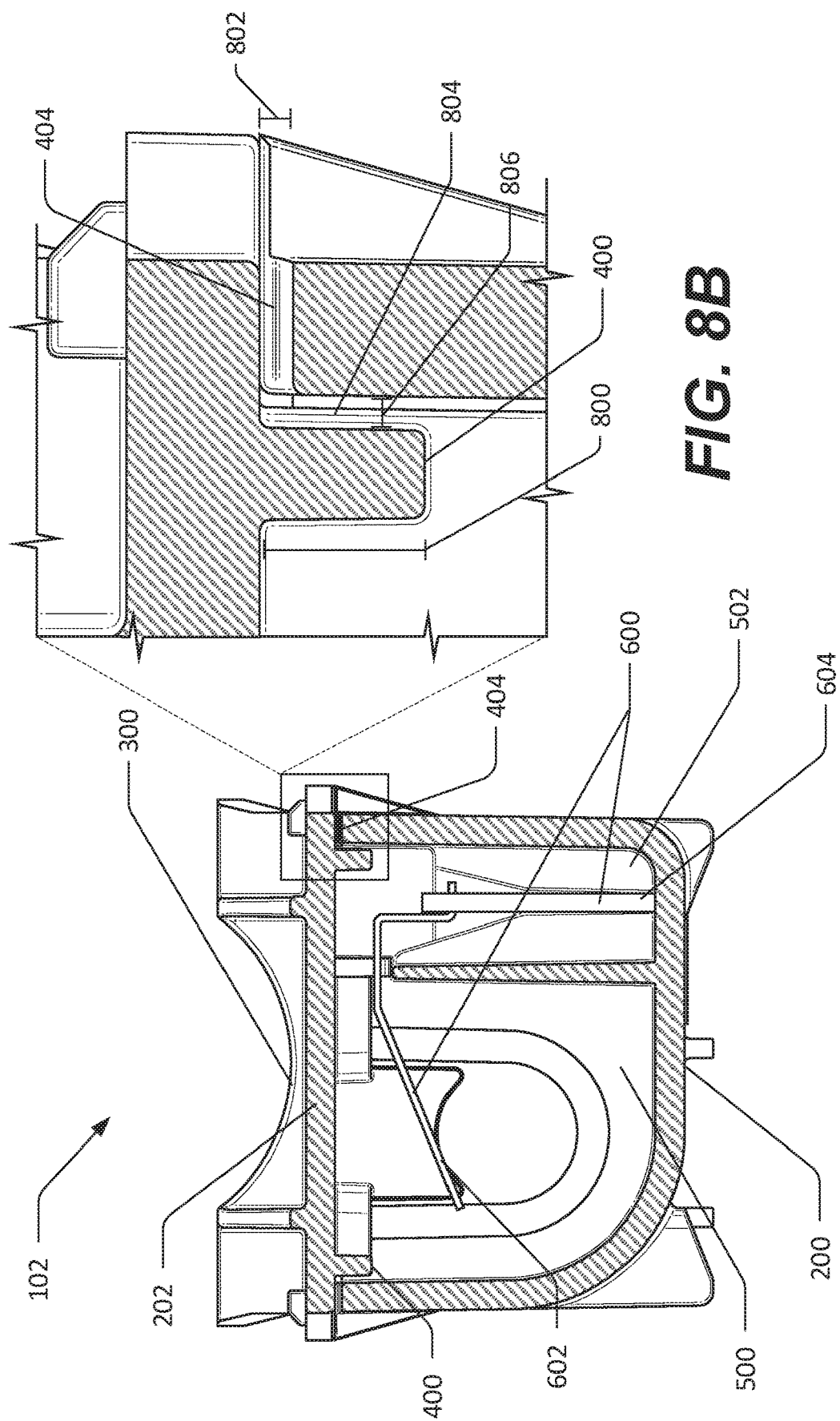

FLOOD SENSOR

BACKGROUND

Many residential and commercial buildings receive utilities from city, county, municipality, or other incoming utility pipes, also known as utility lines. These utility lines may lead to appliances located within the buildings. In cases of natural disaster, such as flooding, some appliances that are connected to a gas line may be disconnected from the gas line causing the gas to fill the building creating a hazardous situation. Thus, it is desirable to quickly detect the natural disaster and to turn off the utility being provided to the appliances before the appliance may float away.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 4A illustrates a front view of a flood sensor apparatus;

FIG. 4B illustrates a view of a back cover of a flood sensor apparatus;

FIG. 4C illustrates a front view of a flood sensor apparatus with gaps of the flood sensor apparatus highlighted;

FIGS. 5A and 5B illustrate a housing of a flood sensor apparatus;

FIGS. 6A and 6B illustrate an unassembled flood sensor apparatus;

FIG. 8A illustrates a cross-sectional view of a flood sensor apparatus;

FIG. 8B illustrates a rib of a back cover of the flood sensor apparatus;

DETAILED DESCRIPTION

Overview

Figure 1:
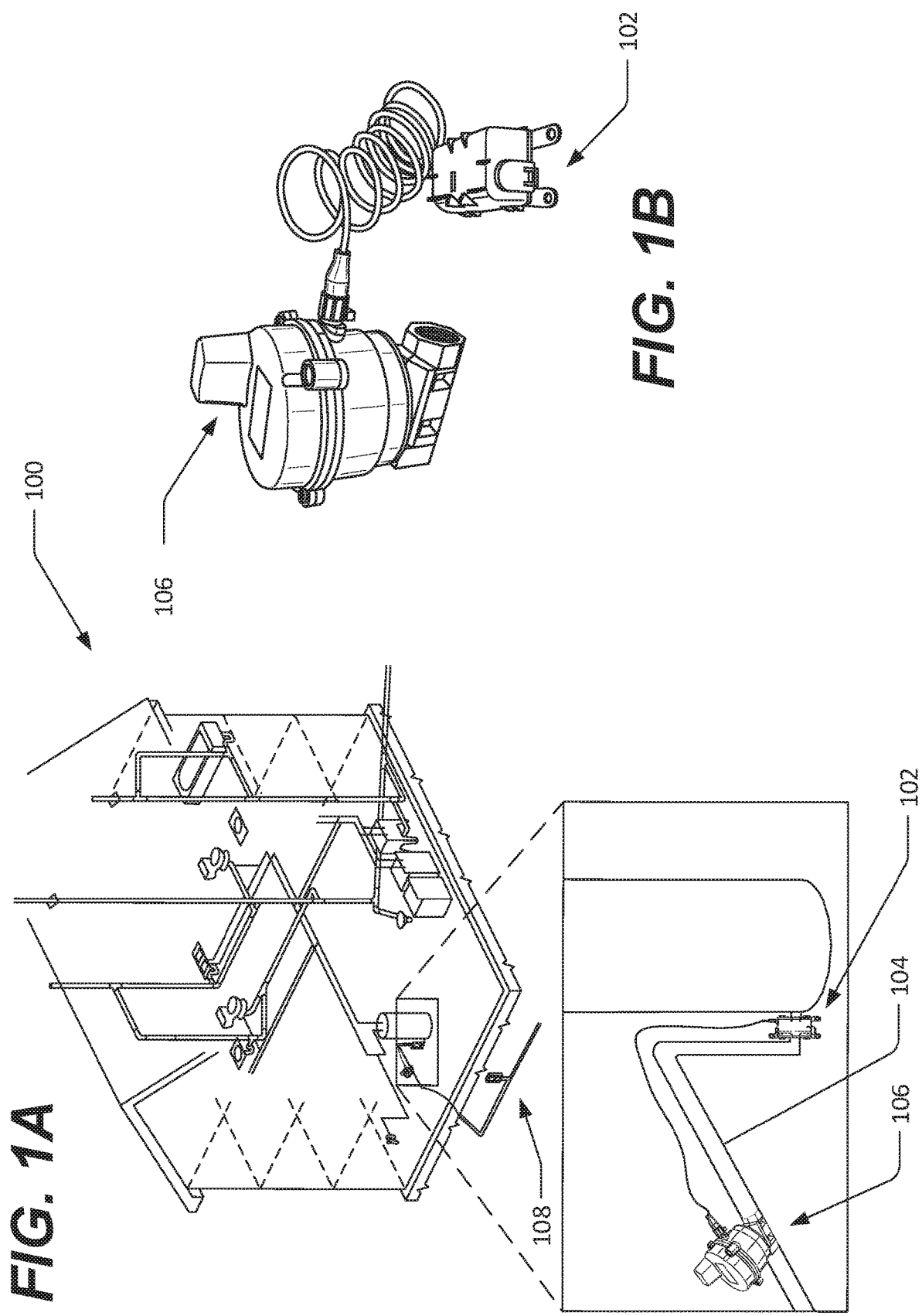
FIG. 1A illustrates a perspective view of a flood sensor apparatus coupled with a valve installed in a utility line system in a residential application.
FIG. 1B illustrates a perspective view of a flood sensor coupled with a valve.

This disclosure describes an example flood sensor apparatus designed to fill and drain quickly (e.g., less than three seconds) while remaining tamper-proof in order to reliably send a signal indicating a flooding event. Previous flood sensors apparatuses that include a housing utilize screens to filter out debris that may inhibit the flood sensor from detecting the presence of water. These screens often become clogged and prevent water from entering the flood sensor rendering the flood sensor apparatus inoperable. In some cases, flood sensors may not include an outer covering entirely and are susceptible to tampering or detecting false positives. Thus, it is desirable for a flood sensor apparatus to be designed such that water may quickly fill and drain an interior that houses a flood sensor and that effectively filters out debris while maintaining tamper protection.

In one example, a flood sensor apparatus may be coupled with a valve that is directly in line with a utility line (e.g., gas line, water line, etc.) and located at a site receiving a utility. The flood sensor apparatus may include a housing and a back cover which, when coupled together, form gaps along a perimeter of the flood sensor apparatus such that fluid (e.g., water) may quickly fill and drain an interior of the housing. These gaps may be large enough such that the fluid may quickly fill and drain the interior of the housing but small enough that debris may not clog the gap or enter the interior of the housing. In some cases, the gap may have a width of approximately 0.025 inches. In some examples, the back cover may include a rib extending from an inner face of the back cover and that that runs along a perimeter of the inner face. The rib may prevent anyone from tampering with a flood sensor located in the interior of the housing by blocking any object that may be inserted into the gaps. In some examples, the flood sensor apparatus may include a wire cable assembly which may be utilized to send a signal to a computing device (e.g., a valve, a smart utility meter, etc.) that may indicate that a flooding event is occurring. In some cases, the signal may cause the computing device to turn off a utility (e.g., water, gas, electricity) that is being provided to the site in which the flood sensor apparatus is located.

Flood sensor apparatuses according to this disclosure may be designed for use with a variety of utility lines, such as, for example, water lines and gas lines in residential or commercial applications.

The present disclosure will now be described to provide an overall understanding of the principles of the structure, function, manufacture, and use of the devices and methods disclosed herein. One or more examples of the present disclosure are illustrated in the accompanying drawings. Those of ordinary skill in the art will understand that the devices and methods specifically described herein and illustrated in the accompanying drawings are non-limiting embodiments and that the scope of these embodiments is defined solely by the claims. The features illustrated or described in connection with one embodiment may be combined with the features of other embodiments. Such modifications and variations are intended to be included within the scope of the appended claims.

Additional details are described below with reference to several example embodiments.

Example Flood Sensor Apparatus

FIGS. 1A and 1B illustrate an example environment 100 in which a flood sensor apparatus 102 is installed proximate to an appliance. The flood sensor apparatus 102 can be installed at any point proximate to a floor and/or an appliance such that in the case of a flooding event, the flood sensor apparatus will detect the flooding event before the water rises to an unsafe height (e.g., a height at which an appliance may float away from a gas line). In the example of FIG. 1, the flood sensor apparatus 102 is located in a basement of a house near an appliance. The flood sensor apparatus 102 may detect a flooding event at the site and send a signal to a valve 106 or a smart utility sensor 108 that is located upstream of a gas line 104. The signal may indicate that a flooding event is occurring at the site and may cause the valve 106 or the smart utility sensor 108 to turn off the gas being provided to the site. In some cases, the valve 106 may include an electronics module capable of receiving the signal and being configured to send a transmission to a smart utility sensor 108 and/or a utility provider that a flooding event is occurring, in response to receiving the signal from the flood sensor apparatus 102. An appliance, as described herein, can be any gas outlet in the downstream gas line 104, such as furnaces, kitchen ranges, hot water heaters, outdoor BBQ grills, outdoor radiant heating, clothes dryers, fireplaces, etc.

In some embodiments, multiple flood sensor apparatuses 102 can be installed at a site and be coupled with various computing devices at the site. For example, the flood sensor apparatuses 102 can be installed proximate to every appliance or in multiple rooms at a site that may use gas and/or be coupled with a gas line. Multiple flood sensor apparatus 102 may be coupled to a single valve 106 or a single smart utility sensor 108. Flood sensor apparatuses 102 may alternatively or additionally be located (even without association with an appliance) where water build-up will be first detected, such as in a low spot. Use of multiple flood sensor apparatus 102 increases the likelihood of detecting a flooding event and that gas will be turned off at the site during the flooding event.

Figure 2:
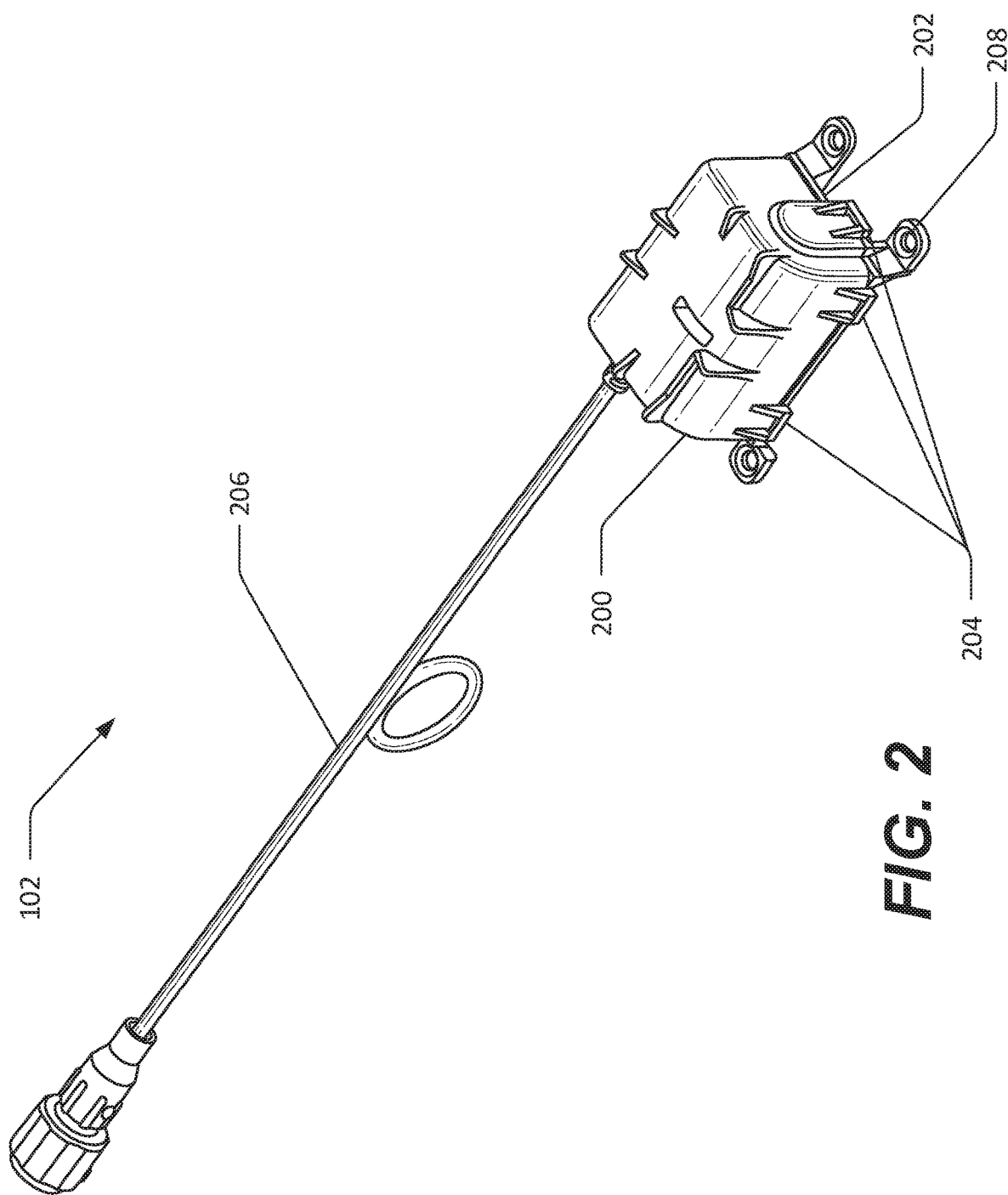
FIG. 2 illustrates a front, perspective view of a flood sensor apparatus.

FIGS. 2-8 illustrate an example embodiment of a flood sensor apparatus 102. As shown in FIG. 2, the flood sensor apparatus 102 can include a housing 200 defining an at least partially hollow interior. The housing 200 may be coupled with a back cover 202 via coupling components 204. In the example shown, the housing 200 and the back cover 202 may be connected by a snap-fit connection, although others means of connection may be used, such as alternative fasteners, welding, or a unified construction. The housing 200 and the back cover 202 may be releasably coupled together. In some examples, the housing 200 and the back cover 202 may be coupled together such that the only way to separate the housing 200 and the back cover 202 would be to destroy the coupling components 204, thereby destroying the flood sensor apparatus 102. By coupling the housing 200 and the back cover 202 this way, the flood sensor apparatus 102 may deter anyone from attempting to tamper with the flood sensor apparatus 102 by trying to separate the housing 200 and the back cover 202. A cable 206 may extend from a top portion of the flood sensor apparatus 102 and may be used to couple with and emit a signal to a computing device, such as the valve 106, indicating that a flooding event is occurring. The cable 206 may include a 3-conductor cable assembly to connect to the valve 106 or the smart utility sensor 108. In some examples, the flood sensor apparatus 102 may include at least one opening 208 for attachment to a wall or object via one or more attachment means, such as screws, nails, pins, staples, tacks, etc.

Figure 3:
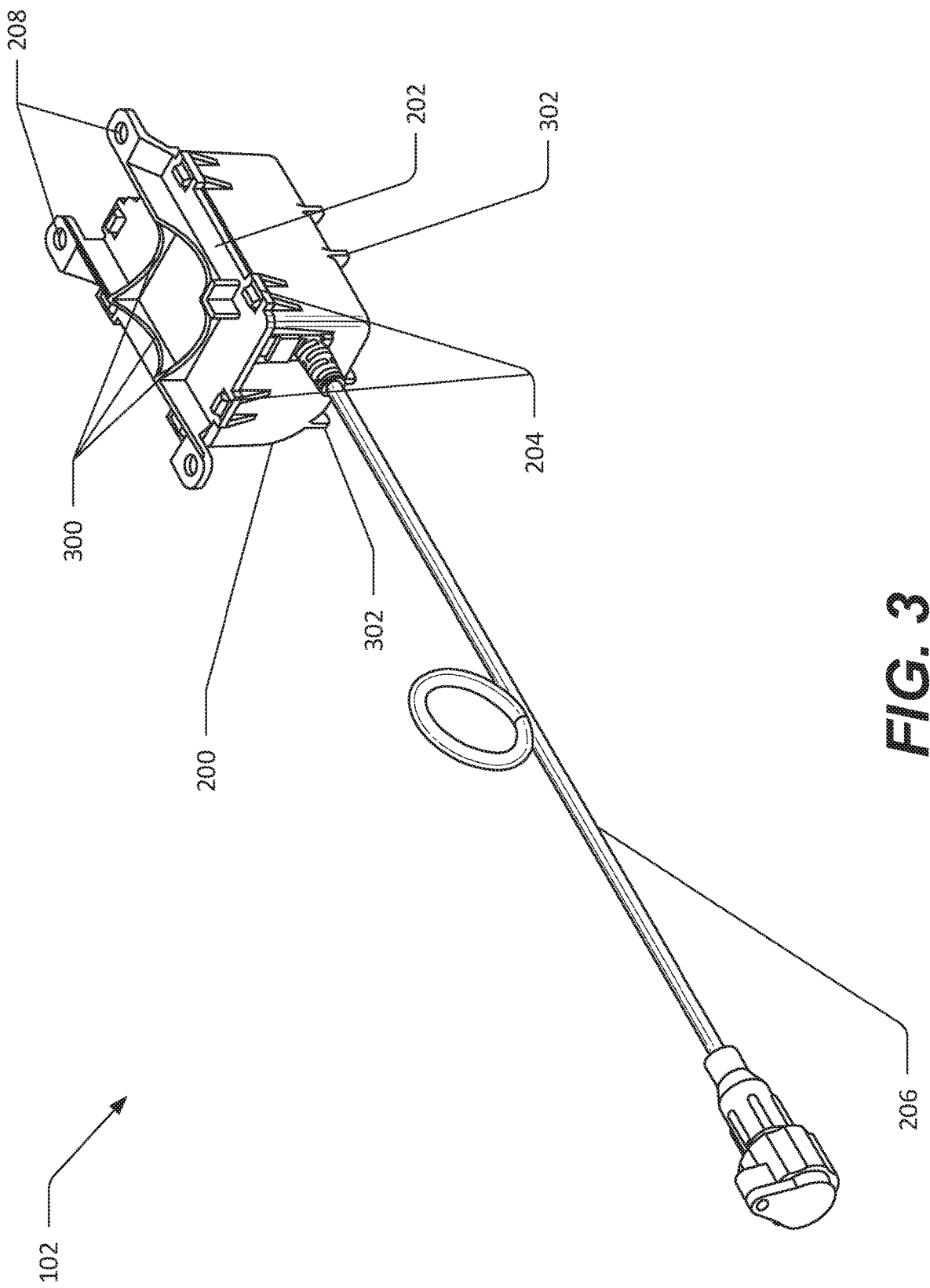
FIG. 3 illustrates a back, perspective view of a flood sensor apparatus.

FIG. 3 illustrates the flood sensor apparatus 102 as well as the housing 200, the back cover 202, the coupling components 204, and the cable 206. FIG. 3 also illustrates curved portions 300 which may be sized to fit around a pipe and/or utility line, such as the gas line 104, such that when the flood sensor apparatus 102 is being secured to a wall or an object, the curved portions 300 allow the flood sensor apparatus 102 to lay flat against the pipe and/or utility line. The square shaped alignment of the curved portions 300 allow the flood sensor apparatus 102 to be mounted in either a vertical or a horizontal position. The housing 200 also includes ribs 302 which are aligned with the curved portions 300 such that a strap may be placed in the spacing between the ribs 302 securing the flood sensor apparatus to the pipe and/or utility line. In some cases, the flood sensor apparatus 102 may be mounted into a wall (e.g., wood, concrete, block, drywall, etc.) and the openings 208 may be utilized to secure the flood sensor 102 to the wall.

FIG. 4A illustrate a front view of the housing 200 of the flood sensor apparatus 102. FIG. 4B illustrates a view of the back cover 202 of the flood sensor 102. In some examples, the back cover 202 may include a rib 400 extending from an inner face 402 of the back cover 202 and that runs along a perimeter of the inner face 402. The rib 400 may prevent anyone from tampering with a flood sensor located in the interior of the housing 200 by blocking any object that may be inserted into gaps formed between the housing 200 and the back cover 202. FIG. 4C illustrates locations of gaps 404 which may be formed between the housing 200 and the back cover 202. The gaps 404 may have a width which allows an interior of the housing 200 to be filled with fluid (i.e., water from a flood) but may prevent debris from entering the interior of the housing 200 and may prevent the gaps 404 from clogging and preventing entry of fluid into the interior of the housing 200. In some cases, the width of the gaps 404 may be approximately 0.025 inches. In some cases, the width of the gaps 404 may be greater or less than 0.025 inches. By locating the gaps 404 around the perimeter of the flood sensor apparatus 102, the interior of the housing 200 may quickly fill and drain as air can escape from a first gap 404 as a second gap 404 is receiving fluid. In some cases, the interior of the housing 200 may fill as quickly as 3 seconds. In some cases, the interior of the housing 200 may fill less or more than 3 seconds. In some examples, the width of the gaps 404 may be less than the distance by which the rib 400 extends from the inner face 402 such that the rib 400 may block and prevent insertion of an object into the gaps 404.

FIGS. 5A and 5B illustrate an example housing 200 of the flood sensor apparatus 102. The housing 200 may include a first interior portion 500, a second interior portion 502, a wall 504, and coupling components 204. In some examples, the housing 200 may have a height 506 ranging from 2 to 3 inches (e.g., 2.46 inches), a length 508 ranging from 1.5 inches to 2 inches (e.g., 1.71 inches), and a width 510 ranging from 1 to 1.5 inches (e.g., 1.30 inches). The first interior portion 500 may include a volume capable of housing a flood sensor, such as a resistive type flood sensor or a float type flood sensor. The second interior portion 502 may include a volume capable of housing a circuit board of the flood sensor configured to communicate with the flood sensor and to generate a signal in response to the flood sensor detecting a flooding event.

FIGS. 6A and 6B illustrate an example flood sensor apparatus 102 including the housing 200, the back cover 202, the first interior portion 500, the second interior portion 502, and a flood sensor 600 that is disassembled. The flood sensor 600 may include a resistive type flood sensor having prongs 602 and circuit board 604. The circuit board 604 may be housed in the second interior portion 502 and the prongs 602 may be coupled with the circuit board 604 such that the prongs 602 extend into the first interior portion 500. In some cases, when a conductive fluid, such as water, enters the housing (e.g., via the gaps 404), the conductive fluid may complete a circuit between the prongs 602 and cause the circuit board 604 to generate a signal that may be emitted via the cable 206 that indicates that a flooding event is occurring at a site in which the flood sensor apparatus 102 is installed. In some cases, the signal may cause a computing device, such as the valve 106 or the smart utility sensor 108, to turn off a utility (e.g., gas, water, etc.) being provided to the site. Although FIGS. 6A and 6B illustrate a resistive type flood sensor housed in the first interior portion 500, it is to be understood that any type of flood sensor may be housed in the interior portion 500, such as a float type flood sensor.

Figure 7A:
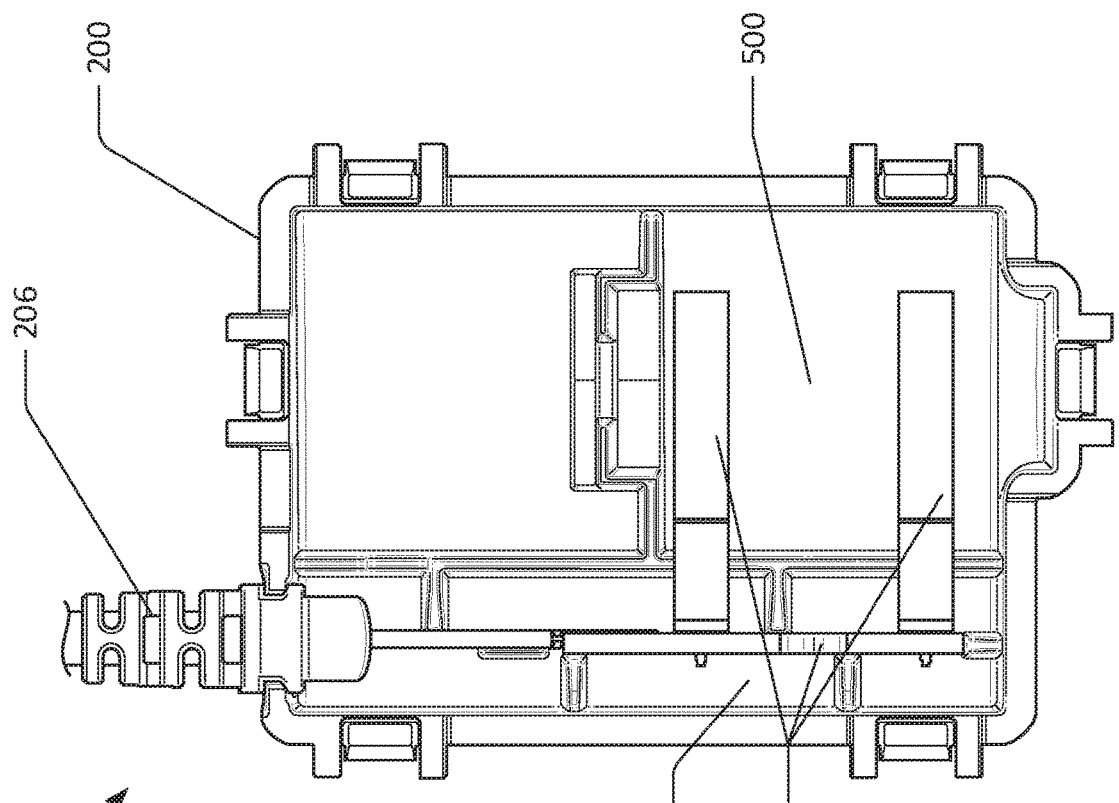
FIGS. 7A and 7B illustrate a housing of a flood sensor apparatus.
Figure 7B:
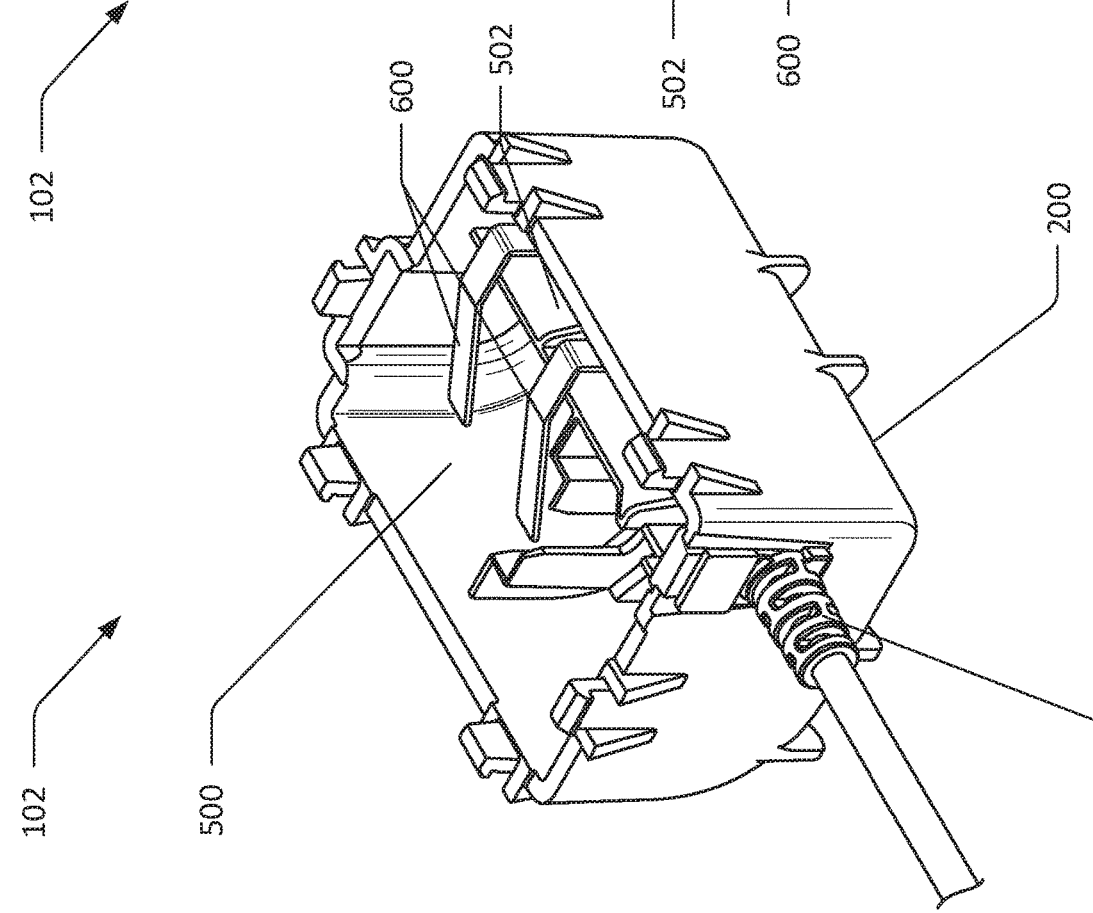

FIGS. 7A and 7B illustrate an example flood sensor apparatus 102 including the housing 200, the first interior portion 500, and the second interior portion 502, with the flood sensor 600 and the cable 206 assembled into the first interior portion 500 and the second interior portion 502.

FIGS. 8A and 8B illustrate a cross-sectional view of an example flood sensor apparatus 102 including the housing 200, the back cover 202, the curved portions 300, the rib 400, the first interior portion 500, the second interior portion 502, the flood sensor 600, the prongs 602, and the circuit board 604.

In some examples, the circuit board 604 may be housed in the second interior portion 502 and the prongs 602 may be coupled with the circuit board 604 such that the prongs 602 extend into the first interior portion 500.

In some examples, the curved portions 300 may be sized to fit around a pipe and/or utility line, such as gas line 104, and attached to the pipe and/or utility line via a strap secured by the ribs 302. In some examples, the flood sensor apparatus 102 may be secured to a wall or flat object and the openings 208 may lay flat against the wall or the object and secured via fasteners, such as screws, nails, sealants, clamps, etc.

In some examples, the rib 400 may prevent anyone from tampering with the prongs 602 of the flood sensor 600 located in the first interior portion 500 by blocking any object that may be inserted into the gaps 404 formed between the housing 200 and the back cover 202. The rib 400 may extend from the back cover 202 a length 800 that may be greater than a width 802 of the gaps 404. The rib 400 may form a passage 804 having a width 806 by which fluid may travel from the gaps 404 into the first interior portion 500 and the second interior portion 502. In some examples, the length 800 may be approximately 0.125 inches and the width 802 and the width 806 may be approximately 0.025 inches. The width 802 of the gaps 404 allows the first interior portion 500 and the second interior portion 502 of the housing 200 to be filled with fluid (i.e., water from a flood) but may prevent debris from entering the interior of the housing 200 and may prevent the gaps 404 from clogging and preventing fluid to enter the first interior portion 500 of the housing 200. In some cases, the length 800 may be greater or less than 0.125 inches and the width 802 and 806 may be greater or less than 0.025 inches. By locating the gaps 404 around the perimeter of the flood sensor apparatus 102, the first interior portion 500 and the second interior portion 502 of the housing 200 may quickly fill and drain as air can escape from an open gap 404 as a different gap or portion of a gap 404 is receiving fluid. In some cases, the first interior portion 500 and the second interior portion 502 of the housing 200 may fill and/or drain in as quickly as 3 seconds. In some cases, the first interior portion 500 and the second interior portion 502 of the housing 200 may fill and/or drain in less or more than 3 seconds.

The components described above in the present disclosure and as shown in FIGS. 1-8B can be separate components coupled together or can be produced as one component or as combined components. For example, the housing 200 including the coupling components 204 of the housing 200, the first interior portion 500 of the housing 200, the second interior portion 502 of the housing 200, and the wall 504 of the housing 200 can be one component. The back cover 202 including the curved portions 300 of the back cover 202, the holes 208 of the back cover 202, and the rib 400 of the back cover 202 can also be one component. When the various components described in the present disclosure are separate components, some or all the components can be releasably coupled to the other components. The flood sensor apparatuses 102 described herein can be of varying sizes and scales.

The presently disclosed flood sensor apparatuses 102 can be made of one or more of various materials, including but not limited to metal and plastic. When made of metal, the flood sensor apparatuses 102 can be made of any metal with suitable strength and corrosion-resistance, such as brass or bronze, to create the devices described herein. The various components of the flood sensor apparatuses 102 disclosed herein may have additional grooves, slots, indentations, and other components to facilitate the function of the device as described herein.

The various components of the flood sensor apparatuses 102 disclosed herein can be made using techniques known to those having skill in the art of metal working, including, for example, by milling or hot pressing. And plastic design such as injected molded thermoplastics, such as polycarbonate or Acrylonitrile butadiene styrene (ABS).

Exemplary Method of Implementation

Figure 9:
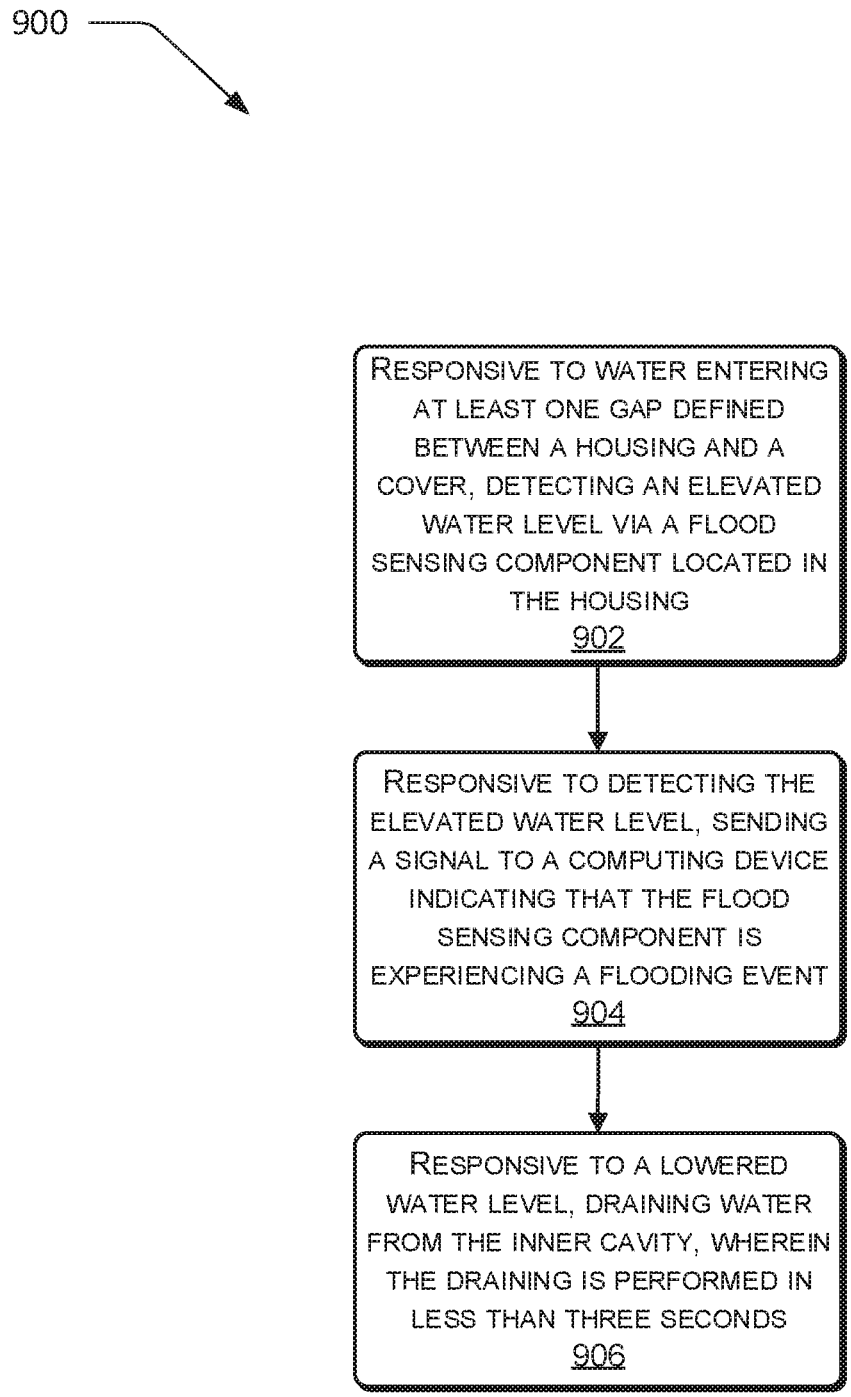
FIG. 9 is an exemplary flowchart illustrating an example by which a flood sensor apparatus may operate.

Turning now to FIG. 9, there is illustrated an exemplary method 900 of operating a flood sensor apparatus 102 such as that disclosed herein. The example method of operations 900 is described in the context of the example of architecture 100 and with reference to the devices illustrated in FIGS. 1-8. However, the method of operations 900 is not limited to use with the architecture 100 and devices of FIGS. 1-8 and may be implemented using other architectures and devices.

Before operation, in one embodiment, the flood sensor apparatus 102 can be installed at any point proximate to a floor and/or an appliance such that in the case of a flooding event, the flood sensor apparatus will detect the flooding event before the water rises to an unsafe height, as shown in FIG. 1. The flood sensor apparatus 102 can be installed by coupling the flood sensor apparatus 102 with a pipe and/or a utility line or by attaching the flood sensor apparatus 102 to a wall or to an object proximate to a floor. Various fasteners, such as screws, nails, sealants, clamps, or components can be used to ensure that the flood sensor apparatus 102 is securely coupled with the wall or other supportive structure.

At block 902, responsive to water entering at least one gap defined between a housing and a cover, the flood sensor apparatus 102 may detect an elevated water level via a flood sensing component located in the housing. In one embodiment, the flood sensor apparatus 102 may include gaps 404 formed between the housing 200 and the back cover 202. The gaps 404 may have a width which allows an interior of the housing 200 to be filled with fluid (i.e., water from a flood) but may prevent debris from entering the interior of the housing 200 and may prevent the gaps 404 from clogging and preventing fluid from entering the interior of the housing 200. In some cases, the width of the gaps 404 may be approximately 0.025 inches. In some cases, the width of the gaps 404 may be greater or less than 0.025 inches. By locating the gaps 404 around the perimeter of the flood sensor apparatus 102, the interior of the housing 200 may quickly fill and drain as air can escape from an open gap 404 as a different gap 404 is receiving fluid.

In block 904, responsive to detecting the elevated water level, the flood sensing apparatus may send a signal to a computing device indicating that the flood sensing component is experiencing a flooding event. In one embodiment, the flood sensor 600 of the flood sensing apparatus 102 may include a resistive type flood sensor having prongs 602 and circuit board 604. The circuit board 604 may be housed in the second interior portion 502 and the prongs 602 may be coupled with the circuit board 604 such that the prongs 602 extend into the first portion 500. In some cases, when a conductive fluid, such as water, enters the housing (e.g., via the gaps 404), the conductive fluid may complete a circuit between the prongs 602 and cause the circuit board 604 to generate a signal that may be emitted via the cable 206 that indicates that a flooding event is occurring at a site in which the flood sensor apparatus 102 is installed. In some cases, the signal may cause a computing device, such as the valve 106 or the smart utility sensor 108, to turn off a utility (e.g., gas, water, etc.) being provided to the site.

In block 906, responsive to a lowered water level, the flood sensor apparatus 102 may drain water from the inner cavity, wherein the draining is performed in less than three seconds. In some embodiments, by locating the gaps 404 around the perimeter of the flood sensor apparatus 102, the first interior portion 500 of the housing 200 may quickly fill and drain as air can escape from an open gap 404 as a different gap or different portion of the same gap 404 is receiving fluid. In some cases, the first interior portion 500 of the housing 200 may fill as quickly as 3 seconds.

CONCLUSION

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A flood sensor comprising:
    at least one flood sensing component;
    a housing defining an inner cavity and comprising at least one coupling component configured to couple with respective ones of the at least one flood sensing component; and
    a cover having an inner face and an outer face and being configured to couple with the housing such that at least one gap is formed between the housing and the cover, the cover comprising:
        at least one second coupling component located on an outer perimeter of the inner face; and
        a rib extending along an inner perimeter of the inner face and raised at least 0.125 inches above a surface of the inner face;
    wherein the at least one gap is configured to allow fluid to enter the inner cavity and the rib is configured to prevent an object from entering the inner cavity.

2. The flood sensor of claim 1, wherein the at least one flood sensing component comprises at least one of a resistive flood sensing component or a float flood sensing component.

3. The flood sensor of claim 1, wherein the at least one gap comprises six gaps and the six gaps are formed along each side of the flood sensor.

4. The flood sensor of claim 1, wherein the at least one gap has a width of at least 0.025 inches.

5. The flood sensor of claim 1, wherein the outer face of the cover comprises a curved portion configured to be fitted onto a pipe.

6. The flood sensor of claim 1, further comprising a cable and wherein responsive to a flooding event: the at least one flood sensing component is configured to send a signal, via the cable, to a computing device indicating that the flood sensor is experiencing the flooding event.

7. The flood sensor of claim 6, wherein the cable is coupled with the at least one flood sensing component via a top portion of the housing.

8. The flood sensor of claim 1, wherein the housing has a height of at least 2.5 inches, a width of no more than 2 inches, and a depth of at least 1.5 inches.

9. A method performed by a flood sensor apparatus comprising:
    responsive to water entering at least one gap defined between a housing and a cover, detecting an elevated water level via a flood sensing component located in the housing, wherein the at least one gap has a width of at least 0.025 inches;
    responsive to detecting the elevated water level, sending a signal to a computing device indicating that the flood sensing component is experiencing a flooding event, the housing having an inner cavity configured to couple with the flood sensing component and the cover having an inner face and an outer face and being configured to couple with the housing, wherein the cover has a rib extending along an inner perimeter of the inner face; and
    responsive to a lowered water level, draining water from the inner cavity, wherein the draining is performed in less than three seconds.

10. The method of claim 9, wherein detecting the elevated water level comprises detecting the elevated water level with at least one of a sensor of a resistive flood sensing component or a float flood sensing component.

11. The method of claim 9, wherein the at least one gap is configured to allow fluid to enter the inner cavity and the rib is configured to prevent an object from entering the inner cavity.

12. Method of claim 9, further comprising sending the signal, via a cable, to the computing device indicating that the flood sensor apparatus is experiencing the flooding event.

13. The method of claim 9, wherein the at least one gap comprises six gaps and the at least one gap of the six gaps is formed along each side of the flood sensor apparatus.

14. The method of claim 9, wherein the rib is raised of at least 0.125 inches above a surface of the inner face.

15. The method of claim 9, wherein the housing has a height of no more than 2.5 inches, a width of no more than 2 inches, and a depth of no more than 1.5 inches.

16. A flood sensing system comprising:
    at least one flood sensing component;
    a housing defining an inner cavity and comprising at least one coupling component configured to couple with at least one flood sensing component; and
    a cover having an inner face and an outer face and being configured to couple with the housing such that at least one gap is formed between the housing and the cover, the cover comprising at least one second coupling component located on an outer perimeter of the inner face and a rib extending along an inner perimeter of the inner face;
    wherein the at least one gap comprises six gaps and at least some of the six gaps are formed along each side of the flood sensing component and are configured to allow fluid to enter the inner cavity and the rib is configured to prevent an object from entering the inner cavity.

17. The system of claim 16, wherein the at least one gap has a width of at least 0.025 inches.

18. The system of claim 16, wherein the outer face of the cover comprises a curved portion configured to be fitted onto a gas utility pipeline.

19. The system of claim 18, further comprising a cable and wherein responsive to a flooding event, the at least one flood sensing component is configured to send a signal, via the cable, to a computing device indicating that the at least one flood sensing component is experiencing the flooding event.

20. The system of claim 19, wherein the computing device comprises a valve or a utility meter and the signal causes the valve or the utility meter to cease from providing gas to the gas utility pipeline.

* * * * *